Patented June 9, 1925.

1,541,242

UNITED STATES PATENT OFFICE.

HOMER BEHM, OF TULSA, OKLAHOMA, ASSIGNOR TO THE AMERICAN PATENT RIGHTS CORPORATION, OF DOVER, DELAWARE, A CORPORATION OF DELAWARE.

OIL MIXTURE FOR USE IN TREATING PETROLEUM-OIL MATERIAL.

No Drawing. Application filed January 9, 1923. Serial No. 611,663.

*To all whom it may concern:*

Be it known that I, HOMER BEHM, a citizen of the United States, and resident of Tulsa, Oklahoma, have invented certain new and useful Improvements in Oil Mixtures for Use in Treating Petroleum-Oil Material, of which the following is a specification.

My present invention comprises a composition of matter which can be used as an addition to petroleum oils, such as petroleum distillates, including kerosene, for treating the latter to improve the same.

The composition of the present case is preferably made by treating an oil, for instance kerosene, with slaked lime and rosin, and other chemicals such as ammonia, formaldehyde, and if desired, also alcohol, acetone, iodine, many of which are normally insoluble in oil, chlorinated lime and turpentine can also be added, these materials especially the latter, aid in producing a more uniform and more stable blend.

In a specific example of the invention, given for the purpose of illustration, I start with kerosene and I prepare a first mixture, designated as mixture "A," from 400 volumes of ordinary kerosene, 40 volumes of slaked lime, 20 volumes of finely ground rosin, 20 volumes of strong aqua ammonia and 20 volumes of formaldehyde, preferably commercial solution containing about 40%. All of these materials are mixed together and placed in a receptacle which is preferably not completely filled with the mixture, leaving an air space in the upper part of the receptacle above the mixture. This mixture is allowed to stand for about twenty-four hours or longer.

In a separate vessel preferably made of glass or other material which would not be injured by the substances used, are mixed together, equal volumes of alcohol, acetone and tincture of iodine, to produce about 20 volumes of the said mixture. To this mixture of the three ingredients, I add say 5 volumes of slaked lime and 2.5 volumes of ground rosin. This produces what I term mixture "B." This mixture is allowed to stand about 24 hours or longer. I then mix together the materials above referred to as A and B and let this mixture stand for twenty-four hours, and to this mixture I then add thereto a small amount (say 1 to 2%) of chlorinated lime, (bleaching powder). The entire mixture is then allowed to stand for twenty-four hours or more and is then filtered. The mixture is then heated up to a little above high atmospheric temperature, say up to 110 or 125° F., and a small amount (say about 1%) of turpentine is then added thereto. The final mixture is then allowed to cool and can be put up into suitable receptacles.

Without going into detail as to any particular theory of operation of the use of this product, it is stated in a general way, that 1 volume of the above composition can be added to a large quantity, (say 400 volumes) of kerosene, or other petroleum oil material, the mixture then aerated, preferably for several days, and slightly acidulated. It is then filtered and added to an equal volume of gasoline for use as a motor fuel. This use of the product is claimed in my copending case 575,040 filed July 14, 1923.

I claim:

1. A liquid composition for use in treating oils, composed of a mineral oil material, and the reaction products of lime and rosin, formaldehyde, ammonia and turpentine.

2. A liquid composition for use in treating oils, composed of a mineral oil material, and the reaction products of lime, rosin, formaldehyde and ammonia.

3. A liquid medium comprising a mineral oil material, and the reaction products of lime, rosin, formaldehyde and ammonia, alcohol, acetone and tincture of iodine.

4. A liquid medium comprising a mineral oil material, and the reaction products of lime, rosin, formaldehyde and ammonia, alcohol, acetone, tincture of iodine, chlorinated lime and turpentine.

In testimony whereof, I hereto affix my signature.

HOMER BEHM.